April 28, 1953     J. SMITH     2,636,215
METHOD OF AND APPARATUS FOR THE MANUFACTURE
OF COLLAPSIBLE TUBES
Filed May 19, 1950     5 Sheets-Sheet 1

INVENTOR
James Smith
BY
*Connell, Edmonds, Morton and Barrows*
ATTORNEYS

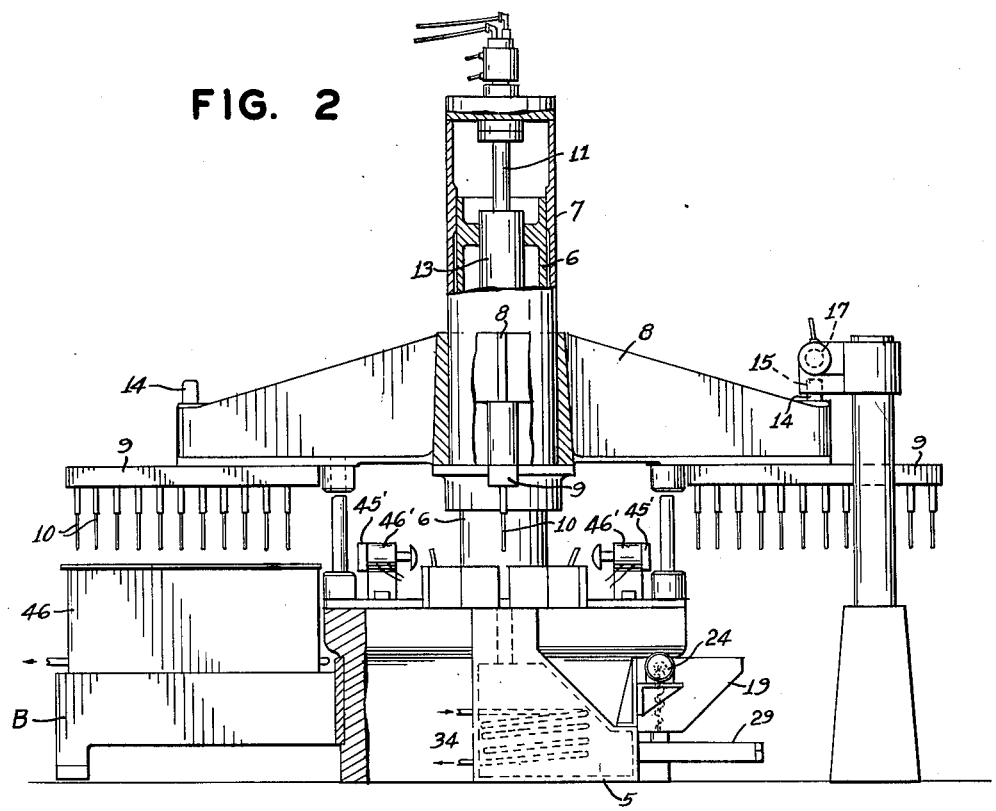
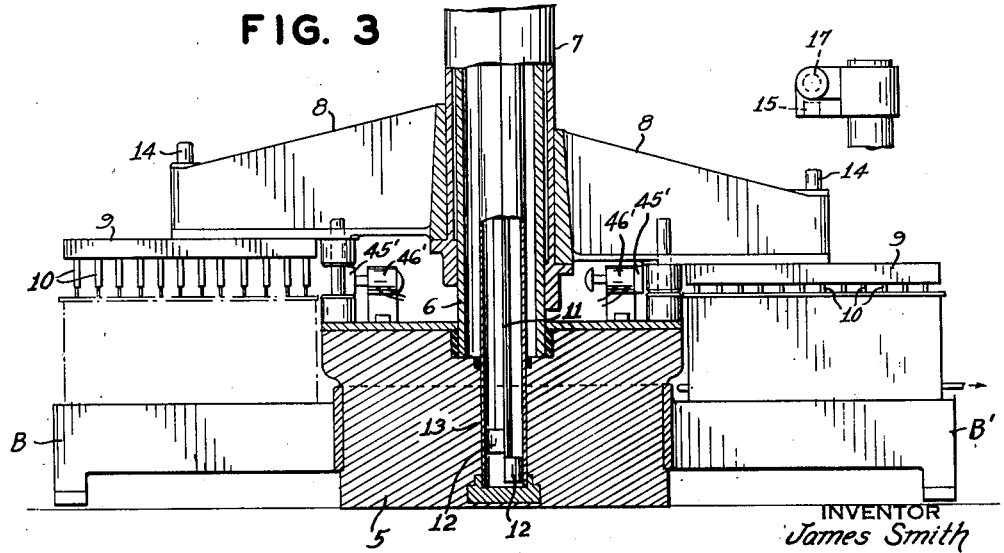

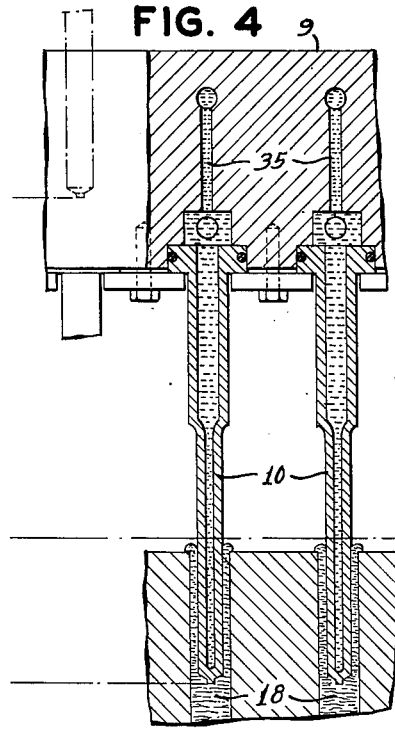
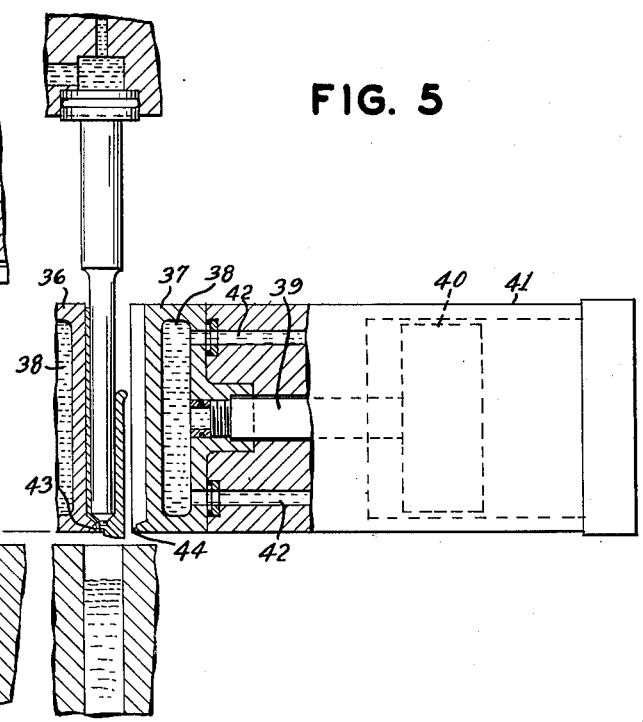
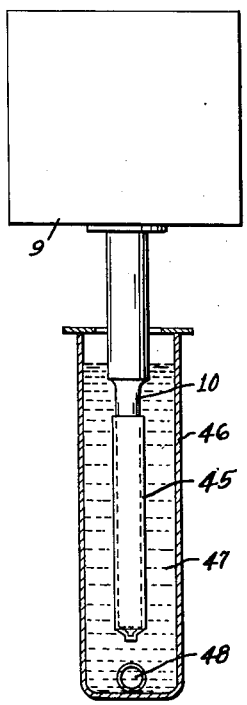
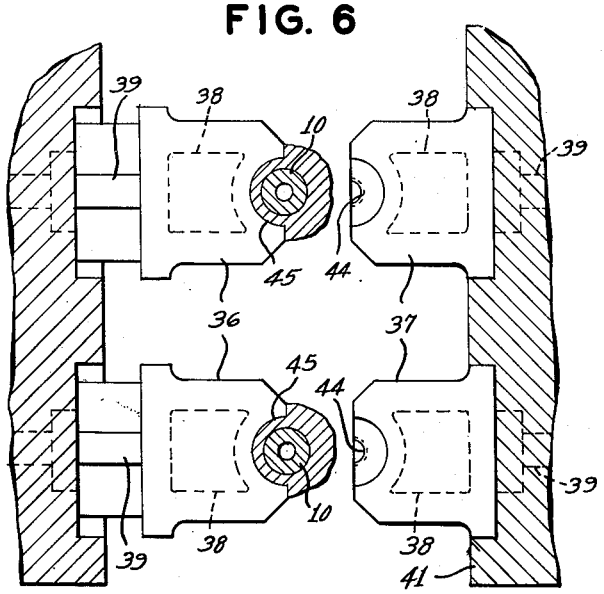

April 28, 1953            J. SMITH            2,636,215
METHOD OF AND APPARATUS FOR THE MANUFACTURE
OF COLLAPSIBLE TUBES
Filed May 19, 1950            5 Sheets-Sheet 4

INVENTOR
James Smith
BY
ATTORNEYS

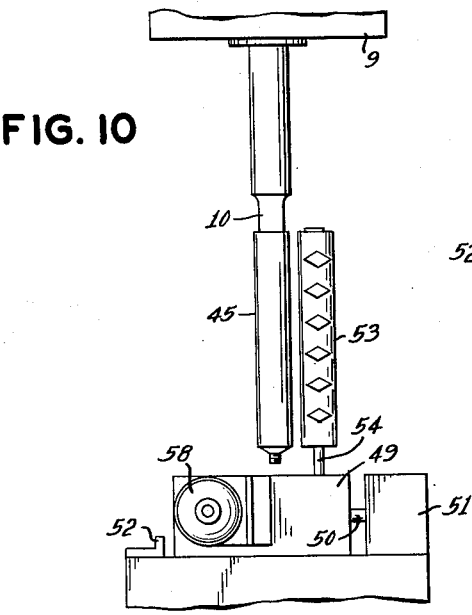
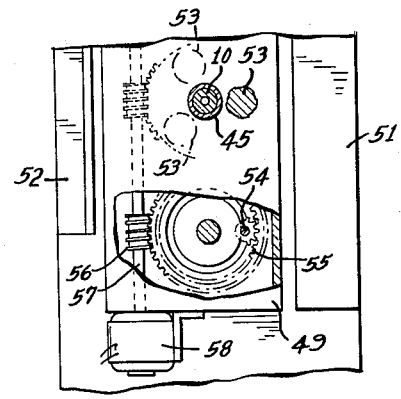
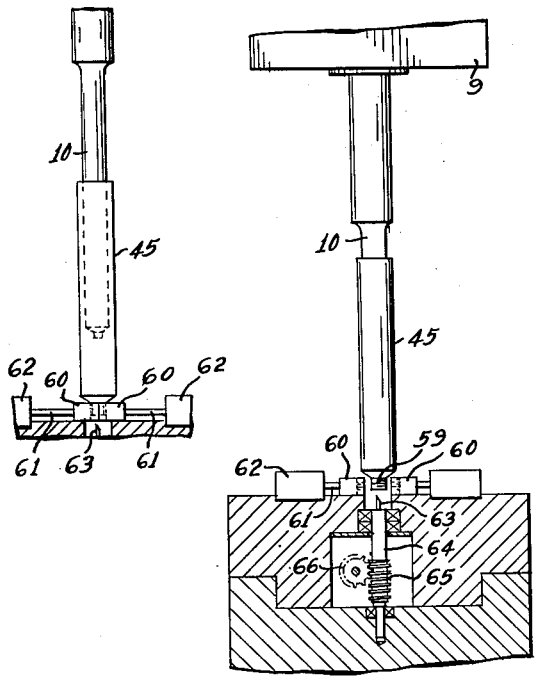
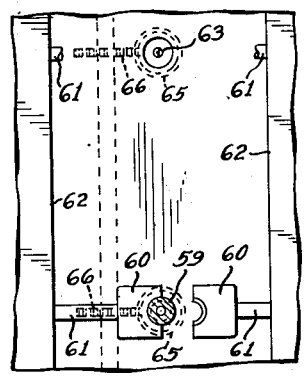

Patented Apr. 28, 1953

2,636,215

UNITED STATES PATENT OFFICE 2,636,215

METHOD OF AND APPARATUS FOR THE MANUFACTURE OF COLLAPSIBLE TUBES

James Smith, Buffalo, N. Y., assignor to Chemical Container Corporation, New York, N. Y., a corporation of Delaware Application May 19, 1950, Serial No. 162,861

7 Claims. (Cl. 18—4)

This invention relates to the manufacture of collapsible tubes such as are used for packaging toothpaste, shaving cream, shoe polish and various other products in paste form, and particularly to a method of and apparatus for producing collapsible tubes from non-metallic, plastic materials.

Heretofore, collapsible tubes have been made principally from tin, lead, aluminum and various metal alloys. Such tubes are becoming increasingly more expensive because of the high cost of metals, and moreover under certain conditions such as those recently existing during the war, the metals were not readily obtainable.

It is the object of the present invention to provide a commercially practicable method of and apparatus for forming collapsible tubes of non-metallic, plastic materials whereby such tubes may be made available at lower cost than metallic tubes.

A further object of the invention is the provision of an inexpensive tube of suitable resinous material having a very low vapor transmission so that the materials will be preserved therein without danger of evaporation and consequent drying.

Other objects and advantages of the invention will be apparent as it is better understood by reference to the following specification and the accompanying drawing, in which:

Fig. 2 is a side elevation partially in section, illustrating the machine;

Fig. 3 is a similar view showing the parts in another position;

Fig. 4 is a detail in section on the line 4—4 of Fig. 1;

Fig. 5 is a detail in section showing the means for molding the tubes;

Fig. 6 is a horizontal section through the mechanism shown in Fig. 5;

Fig. 9 is a sectional view illustrating the initial step of forming the tubes;

Fig. 10 is a detail in elevation illustrating mechanism for coating the tubes after they are formed;

Fig. 11 is a sectional view illustrating the structure shown in Fig. 10;

Fig. 12 is a detail in section illustrating another step in the formation of the tubes;

Fig. 13 is a section illustrating the structure shown in Fig. 12;

Fig. 14 is a sectional view illustrating the stripping of the tubes after they are formed.

Figure 1:
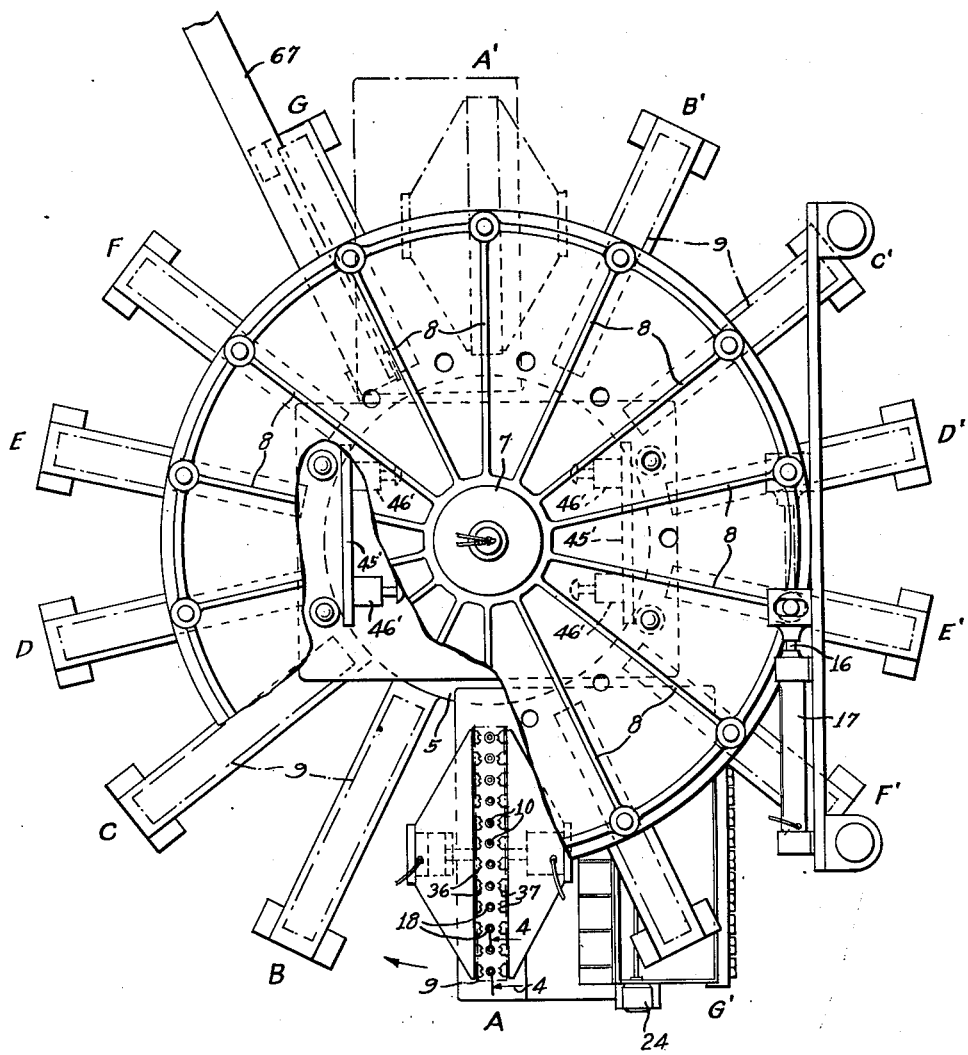
Fig. 1 is a plan view of the apparatus for forming the tubes.

Referring to the drawing, 5 indicates a base or frame to support the machine. A cylinder 6 is securely mounted on the base, projecting upwardly therefrom and forming a guide for an outer cylinder 7 which supports a plurality of arms 8 projecting radially therefrom. In the present embodiment of the invention, there are fourteen such arms, although more or less can be used. The arms constitute a rotatable and vertical reciprocable head. Each of the arms carries a supplemental support 9 having a plurality of depending spindles 10. The diameter of the lower ends of the spindles 10 is equal to the internal diameter of the tube to be formed, and a plurality of tubes are formed thereon during each cycle of operation of the machine.

The cylinder 7 and the arms 8 are raised and lowered by a piston rod 11 having a piston 12 at the lower end thereof disposed in a cylinder 13 in the base 5. By the introduction of a hydraulic fluid to the cylinder 13 beneath the piston 12, the latter can be caused to move upwardly and downwardly at will.

Each of the arms 8 has at its outer end an upwardly projecting pin 14 which, when the arms 8 are in the upper position, are adapted to engage successively in an opening 15 formed at the end of a piston rod 16 extending into a cylinder 17. By the introduction of a suitable hydraulic fluid to the cylinder 17, the piston rod 16 may be reciprocated and it is actuated at intervals while one of the pins 14 is engaged in the opening 15, to turn the head including the arms 8 in a clockwise direction as indicated by the arrow on Fig. 1. Thus, the head, including the arms 8, is rotated step by step, when it is in the upper position, to cause the arms 8 to assume a plurality of separate stations. By means of the piston 12 in the cylinder 13, the head, including the arms 8, may be lowered after each rotational movement and raised again so that the several functions of the machine may be carried out in sequence. As indicated, there are fourteen arms and fourteen stations, but the functions of the machine are duplicated on opposite sides of the machine and consequently its capacity is correspondingly increased.

Figure 7:
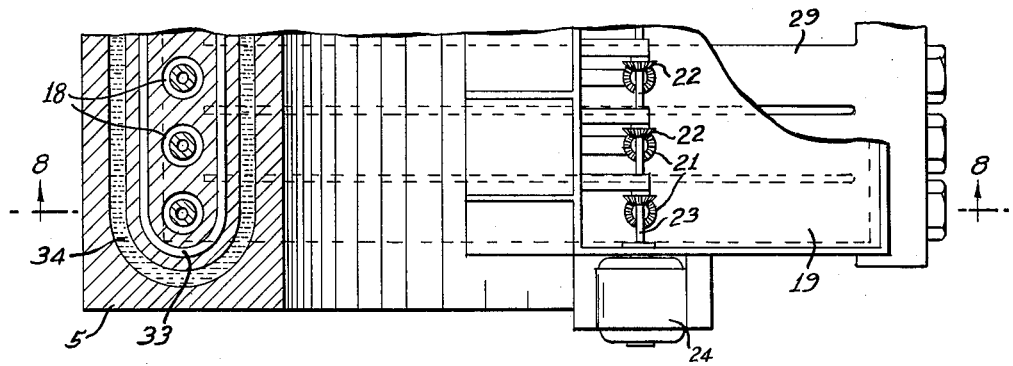
Fig. 7 is a plan view of the means for maintaining the plastic material in molten condition.
Figure 8:
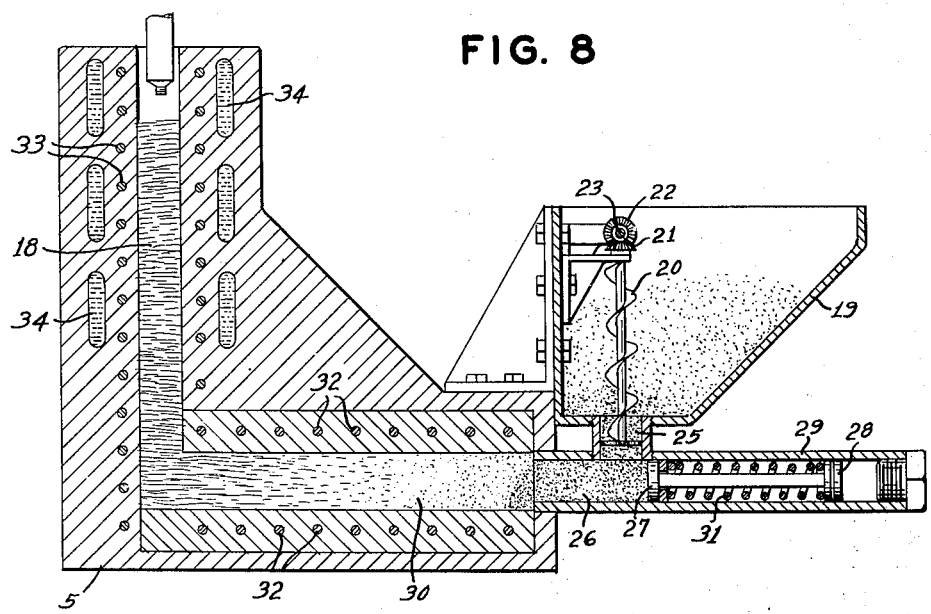
Fig. 8 is a section on the line 8—8 of Fig. 7.

Referring particularly to Figs. 7 and 8, there is formed in the base of the machine a reservoir having a plurality of vertical passages 18 which are aligned so as to receive one group of spindles 10 when the latter are lowered. Plastic material in solid, pulverized form is supplied to a hopper 19 and fed by a screw 20, actuated through bevel gears 21 and 22 on a shaft 23 driven by a motor 24 through a passage 25 into a chamber 26. A ram 27, actuated by a piston 28 in a cylinder 29, forces the material from the chamber 26 into a chamber 30 connected to the passages 18. The piston 28 may be actuated by the introduction of a suitable hydraulic fluid and is returned to its retracted position by a spring 31 within the cylinder 29. Thus, the plastic material is fed as required into the chamber 30 which is surrounded by a heating element 32, preferably an electric resistance element which raises the temperature of the plastic material to the point where it is molten. It flows upwardly into the passages 18 which are also surrounded by heating elements 33, preferably electric resistance elements which serve to maintain a temperature which will hold the plastic material in molten condition. Cooling passages 34, through which a coolant may be circulated, are provided in order that the temperature may be more easily maintained.

The formation of the tubes on the spindles 10 will be more readily understood by reference to Figs. 4 and 5. The spindles 10 are hollow, as indicated in Fig. 4, and are connected through passages 35 with a source of a coolant liquid which prevents overheating of the spindles. When the head including the arms 8 is lowered, one set of spindles 10 enters the passages 18 which are filled with the molten plastic material, and a coating of the plastic material forms on each spindle. As soon as the coating has formed on the spindles 10, the head including the arms 8 is raised to an intermediate position and immediately the plastic material is subjected to powerful pressure exerted by dies 36 and 37 having cooling passages 38. The dies 36 and 37 are formed so as to mold the plastic material into the desired shape, and they are moved into position by piston rods 39 actuated by pistons 40 in hydraulic cylinders 41. Passages 42 are provided to maintain circulation of a coolant liquid through the passages 38, thereby chilling the plastic material as pressure is applied to mold it to the desired form. At the right of Fig. 5, the plastic material is shown on the spindle 10 before molding is effected, the position of the molded material after the pressure has been applied being indicated at the left of the figure. The molds 36 and 37 are provided with threaded portions 43 and 44 which form the neck of the tube with threads to receive the usual cap.

In Fig. 3, the right hand side of the drawing shows the arm 8 in the lowermost or dipping position, and the left hand side shows the arm 8 in the intermediate or working position. In that position, the arms are held firmly by stops 45' actuated by solenoids 46'.

When the tube has been formed, in the manner indicated, on the spindles 10, the molds 36 and 37 are retracted and the arms 8 are raised to the uppermost position. The piston rod 16 is then moved to advance the arms 8 clockwise, thus bringing a new set of spindles 10 into alignment with the passages 18. The head, including the arms 8, is then lowered again, and the tubes 45, already formed on the first set of spindles, are directed into small chambers 46 to which a coolant liquid 47 is supplied through a passage 48. The temperature of the tubes 45 is thus rapidly reduced while a coating of plastic material is being formed on the second set of spindles.

The head, including the arms 8, is then raised again and the plastic material on the second set of spindles is molded as in the preceding operation. Thereafter, the head, including the arms 8, is rotated another step in a clockwise direction and is then again lowered.

Figure 15:
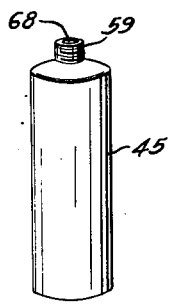
Fig. 15 is an elevation of a finished tube produced in accordance with the invention.

Referring to Fig. 1, the several stations in the operation are lettered A, B, C, D, E, F and G, the tubes being formed at the station A and cooled as hereinbefore described at station B. At station C, a coating composition in the form of printing or otherwise is applied to the tubes, as shown, for example, in Figs. 10 and 11. When the arms 8 are in lowered position, the spindles 10, carrying the tubes 45, are in proper relation to the coating or printing mechanism, as shown in Figs. 10 and 11. The printing or coating mechanism is mounted on a movable block 49 which is adapted to be shifted, by means of a piston 50 and hydraulic cylinder 51, into engagement with a stop 52 on the base. Cylinders 53 are supported on the block 49 and are adapted to be rotated through shafts 54 by ring gears 55 engaging worms 56 on a shaft 57 which is driven by a motor 58. Thus, the coating or printing cylinders 53 rotate and, when brought into contact with the tubes 45, will deposit thereon a coating composition with printing as desired. The cylinders 53 are retracted hydraulically by the piston rod 59 before the head, including the arms 8, is raised to permit the next step of rotation. The mechanism shown in Figs. 10 and 11 is duplicated at stations C, D, E and F so that the coating or printing may be conducted in a series of steps to give the required appearance to the finished tube 45. At station G, an operation is conducted as illustrated in Figs. 12, 13 and 14. In the first step of this operation, the arms 8 being in lowered position, the threaded neck 59 of the tube is gripped by members 60 actuated by piston rods 61 and hydraulic cylinders 62. As the neck 59 is thus firmly held in centered position, a drill 63, supported on an arbor 64 which is driven through a worm 65 and worm gear 66 from a suitable source of power, is moved upwardly to drill an opening through the neck 59, thus completing the tube. At the end of this operation, the head, including the arms 8, is again elevated while the tube is still firmly gripped by the members 60, as shown in Fig. 14. This frees the tubes 45 from the spindles 10 and the members 60 thereafter release the tubes so that they are dropped upon a conveyor 67 which removes them from the machine. The tubes 45 then have the form illustrated in Fig. 15, with a threaded neck 59 and an opening 68. It will be understood that such tubes may be filled with any suitable product through the open lower end thereof and then sealed in the conventional manner.

As already indicated, the functions of the machine are duplicated on opposite sides thereof. Thus, following the station G are stations A', B', C', D', E', F', and G', where functions corresponding to the stations A, B, C, D, E, F and G are performed. In accordance with the invention, at each downward movement of the head, including the arms 8, a new set of tubes is formed at the stations A and A'. When the arms 8 are raised, the plastic material on the spindles 10 is molded under pressure. Thereafter, the arms 8 advance in a clockwise direction one step to the next station, where the previously formed tubes are chilled at station B and a new set of tubes is formed at station A. Thereafter, the arms 8 are rotated, step by step, and at each station the tubes are subjected to a further operation, until they are complete and are discharged at station G and likewise at station G'.

As the material for the tubes, various plastics are available and suitable for the practice of the invention. However, I find that a polyethylene resin, particularly the compound known as DYNH, is best adapted for this purpose. When treated in the manner hereinabove outlined, such a resin will readily coat the spindles and, when subjected to pressure and cooling, will form a tube of uniform wall thickness. The material when at normal temperature is pliable and is highly impervious to the transmission of vapors. Consequently a tube of such material may be employed as a container for various pastes which may include volatile liquids and, because of the low vapor transmission of the tube material, the product will be maintained at its initial condition over long periods of time. The method and apparatus and the collapsible tube produced in accordance with the invention are thus well adapted to produce satisfactory containers for paste materials, and such containers can be manufactured at a cost materially below that of similar metal containers.

Various changes may be made in the details of the apparatus and of the procedure as described without departing from the invention or sacrificing the advantages thereof.

I claim:

1. In an apparatus for making collapsible tubes, the combination of a vertically reciprocable head, a spindle supporting arm supported by said head, a plurality of spindle means supported by said arm, means for raising and lowering the head, means for moving said head so that the spindles are moved successively to a plurality of stations, means at a first of said stations for applying a coating of plastic material to each spindle when the head is lowered at said first station, means also at said first station adapted to cooperate with the spindles for molding the plastic material on the spindles, when the head is raised at said first station from the coating means, to form complete tube bodies on said spindles each including a neck, means at a second of said stations for cooling the molded plastic tube bodies on the spindles when the head is lowered at said second station, and means at a third station for forming an opening in the neck of each tube of plastic material when the spindles are lowered at said third station and while the tubes are still supported by their respective spindles.

2. Apparatus according to claim 1 which includes means at said third station for grasping the necks of the tubes when the spindles are lowered at said station for the formation of the openings in the necks of the tubes to remove the tubes from the spindles when the spindles are subsequently raised.

3. Apparatus according to claim 1 which includes means at at least one station intermediate said second and third stations for applying a coating composition to the outer surface of each tube.

4. Apparatus according to claim 1 which includes means at said third station for grasping the necks of the tubes when the spindles are lowered at said station for the formation of the openings in the necks of the tubes to remove the tubes from the spindles when the spindles are subsequently raised and which also includes means at at least one station intermediate said second and third stations for applying a coating composition to the outer surface of each tube.

5. Apparatus according to claim 4 which includes a plurality of projecting arms supported by said head means, each arm supporting a plurality of spindles, and in which the head means is rotatable and means are provided for rotating said head, projecting arms and spindles successively to the plurality of stations.

6. The method of making a collapsible tube which comprises the successive steps of dipping a spindle into a mass of molten plastic material at a first station, removing said spindle with a coating of plastic material thereon from said molten mass, and applying pressure exteriorly to the coating of plastic material on said spindle to mold said coating to form a complete tube body including a neck, moving said spindle to a second station and there subjecting the molded plastic tube thereon to a cooling medium, and moving the spindle with the cooled plastic tube thereon to a third station and at such third station drilling an opening in the neck of the tubular body while it is still supported on said spindle.

7. The method of making a collapsible tube according to claim 6 which includes the step of applying a coating to the cooled plastic tube after it has been subjected to the cooling medium but before the opening has been drilled in its neck, and which also includes the final step of grasping the neck of the tubular body and removing it from the spindle.

JAMES SMITH.

References Cited in the file of this patent

UNITED STATES PATENTS

| Number | Name | Date |
|---|---|---|
| 2,041,143 | Olson | May 19, 1936 |
| 2,133,947 | Boecler | Oct. 25, 1938 |
| 2,299,269 | Gammeter | Oct. 20, 1942 |
| 2,322,858 | Limbert et al. | June 29, 1943 |
| 2,347,737 | Fuller | May 2, 1944 |
| 2,377,532 | Waters | June 5, 1945 |
| 2,389,319 | McMordie et al. | Nov. 20, 1945 |
| 2,410,936 | Gronemeyer et al. | Nov. 12, 1946 |
| 2,437,109 | Maquat | Mar. 2, 1948 |
| 2,482,418 | Jenkins | Sept. 20, 1949 |